(12) United States Patent
Chaos-Provecho et al.

(10) Patent No.: US 11,949,777 B1
(45) Date of Patent: Apr. 2, 2024

(54) SYSTEMS AND METHODS TO ENCRYPT CENTRALIZED INFORMATION ASSOCIATED WITH USERS OF A CUSTOMER DUE DILIGENCE PLATFORM BASED ON A MODIFIED KEY EXPANSION SCHEDULE

(71) Applicant: SIMUR, INC., Grand Cayman (KY)

(72) Inventors: Javier Alejandro Chaos-Provecho, Madrid (ES); Don Seymour, West Bay (KY)

(73) Assignee: SIMUR, INC., Grand Cayman (KY)

( * ) Notice: Subject to any disclaimer, the term of this patent is extended or adjusted under 35 U.S.C. 154(b) by 0 days.

(21) Appl. No.: 18/362,452

(22) Filed: Jul. 31, 2023

(51) Int. Cl.
*H04L 9/08* (2006.01)

(52) U.S. Cl.
CPC .................. *H04L 9/0825* (2013.01)

(58) Field of Classification Search
None
See application file for complete search history.

(56) References Cited

U.S. PATENT DOCUMENTS

| | | | |
|---|---|---|---|
| 6,542,515 B1 | 4/2003 | Kumar | |
| 6,757,720 B1 | 6/2004 | Weschler, Jr. | |
| 7,593,892 B2 | 9/2009 | Balk | |
| 7,899,722 B1 | 3/2011 | Lawrence | |
| 7,904,361 B2 | 3/2011 | Lawrence | |
| 8,019,691 B2 | 9/2011 | Dominguez | |
| 8,140,415 B2 | 3/2012 | Lawrence | |
| 8,209,246 B2 | 6/2012 | Lawrence | |
| 8,266,051 B2 | 9/2012 | Lawrence | |
| 8,831,972 B2 | 9/2014 | Angell | |
| 9,058,581 B2 | 6/2015 | Lawrence | |
| 9,934,544 B1 | 4/2018 | Whitfield | |
| 10,581,886 B1 | 3/2020 | Sharifi Mehr | |
| 10,915,960 B1 | 2/2021 | Johnson | |
| 10,942,991 B1 | 3/2021 | Kidd | |
| 11,055,772 B1 | 7/2021 | Ram | |
| 11,132,460 B2 | 9/2021 | Chen | |
| 11,558,377 B2 | 1/2023 | Pointner | |
| 2004/0093334 A1 | 5/2004 | Scherer | |
| 2005/0027983 A1 | 2/2005 | Klawon | |
| 2008/0028069 A1 | 1/2008 | Urbanek | |
| 2008/0059633 A1* | 3/2008 | Hu | H04L 41/0893 709/225 |
| 2009/0248465 A1 | 10/2009 | Recce | |
| 2011/0113072 A1 | 5/2011 | Lee | |

(Continued)

FOREIGN PATENT DOCUMENTS

AU  2021101317 A4  5/2021
CN  105025032 A * 11/2015

*Primary Examiner* — Bassam A Noaman
(74) *Attorney, Agent, or Firm* — Esplin & Associates, PC

(57) ABSTRACT

Systems and methods to encrypt centralized information associated with users of a customer due diligence platform based on a modified key expansion schedule are disclosed. Exemplary implementations may: obtain user profile information making up user profiles of users of a customer due diligence platform; encrypt the user profile information to generate encrypted user profile information based on a modified key expansion schedule requiring multiple different keys; effectuate storage of the encrypted user profile information in association with the user profiles in non-transitory electronic storage; and/or perform other operations.

16 Claims, 6 Drawing Sheets

(56) References Cited

U.S. PATENT DOCUMENTS

| | | |
|---|---|---|
| 2012/0036235 A1 | 2/2012 | Chan |
| 2012/0143917 A1 | 6/2012 | Prabaker |
| 2013/0024910 A1 | 1/2013 | Verma |
| 2013/0080911 A1 | 3/2013 | Klemm |
| 2013/0179988 A1 | 7/2013 | Bekker |
| 2014/0279641 A1 | 9/2014 | Singh |
| 2015/0074101 A1 | 3/2015 | Solheim |
| 2015/0135043 A1 | 5/2015 | Apps |
| 2016/0026717 A1 | 1/2016 | Kelsey |
| 2016/0239658 A1* | 8/2016 | Loughlin-McHugh ....... G06F 21/45 |
| 2016/0277528 A1 | 9/2016 | Guilaume |
| 2017/0017383 A1 | 1/2017 | Upadhyaya |
| 2017/0140174 A1 | 5/2017 | Lacey |
| 2017/0316515 A1 | 11/2017 | Varma |
| 2018/0005239 A1 | 1/2018 | Schlesinger |
| 2018/0157662 A1 | 6/2018 | Chin |
| 2018/0165781 A1 | 6/2018 | Rodriguez |
| 2018/0181964 A1* | 6/2018 | Zagarese .......... G06Q 20/40145 |
| 2019/0280862 A1 | 9/2019 | Crego |
| 2019/0342175 A1 | 11/2019 | Wan |
| 2020/0026834 A1 | 1/2020 | Vimadalal |
| 2020/0074111 A1 | 3/2020 | Mitchell |
| 2020/0177598 A1 | 6/2020 | Storr |
| 2020/0242232 A1 | 7/2020 | Machani |
| 2020/0366671 A1 | 11/2020 | Larson |
| 2021/0019763 A1 | 1/2021 | Helles |
| 2021/0075788 A1 | 3/2021 | Pasterk |
| 2021/0195260 A1 | 6/2021 | Major |
| 2021/0351927 A1 | 11/2021 | Gal |
| 2021/0374749 A1 | 12/2021 | Vukich |
| 2022/0035952 A1 | 2/2022 | Brannon |
| 2022/0076262 A1 | 3/2022 | Boyd |
| 2022/0122087 A1 | 4/2022 | Gosset |
| 2022/0139535 A1 | 5/2022 | Kushnir |
| 2022/0200937 A1 | 6/2022 | Bar-On |
| 2022/0240095 A1* | 7/2022 | Kovac ............... H04L 9/0631 |
| 2022/0300703 A1 | 9/2022 | McArthur |
| 2022/0337443 A1 | 10/2022 | Sood |
| 2022/0351284 A1 | 11/2022 | Cañón Paez |
| 2022/0368685 A1* | 11/2022 | Pollack ............. H04L 65/1093 |
| 2022/0414323 A1 | 12/2022 | Sreenivasan |
| 2023/0061746 A1 | 3/2023 | Wei |
| 2023/0080322 A1 | 3/2023 | Smith |
| 2023/0145179 A1 | 5/2023 | Chen |
| 2023/0199028 A1 | 6/2023 | Ho |
| 2023/0205833 A1 | 6/2023 | Rudra |

* cited by examiner

500

| 502 Shared With | Status | Shared On |
|---|---|---|
| ABC Bank Co. | Accepted | 17 Jan 2023 |
| XYZ Investments Inc. | Under Review | 22 Feb 2023 |

| 602 Document type | Entity type | Required |
|---|---|---|
| Passport | Individual | ☐ |
| Bank Statement | Any | ☑ |
| Business License | LLC | ☑ |

FIG. 6

| 702 | 704 | 706 | 708 |
|---|---|---|---|
| | Shared With | Status | Requested On |
| | Tom C. | Accepted | 10 Jan 2023 |
| | Alpha Corp. | Under Review | 14 Dec 2022 |

Tom C.
09/04/1981
USA
San Diego, CA
858-555-5505

806

| Document Name | Status | Date |
|---|---|---|
| *Government ID* | Uploaded | 16 Jan 2023 |

Risk Rating:

Very Low — 812 — 814 — Very High

FIG. 8

SYSTEMS AND METHODS TO ENCRYPT CENTRALIZED INFORMATION ASSOCIATED WITH USERS OF A CUSTOMER DUE DILIGENCE PLATFORM BASED ON A MODIFIED KEY EXPANSION SCHEDULE

FIELD OF THE DISCLOSURE

The present disclosure relates to cryptography using a key expansion schedule, and in particular, systems and methods to encrypt information based on a modified key expansion schedule.

BACKGROUND

Financial and other institutions are regulated by strict due diligence procedures. By way of non-limiting illustration, a due diligence procedure referred to as Know Your Customer ("KYC") is a process that financial companies use to verify customer identity and assess and monitor risk factors for fraud and other financial crimes. KYC ensures a customer is who they say they are. For business customers, institutions follow Know Your Business ("KYB") procedures which allow companies to adhere to regulatory obligations with respect to verifying the identity of business customers and monitoring their risk. In the United States and elsewhere, these procedures are required for any financial institution that deals with customers while opening and maintaining financial accounts. Compliance with regulations helps prevent money laundering, terrorism financing, fraud schemes, and other crimes. By verifying a customer's identity and intentions when the account is opened, financial and other institutions can more accurately pinpoint suspicious clients and their activities.

SUMMARY

The majority of modern service providers operate over the Internet and often handle (e.g., exchange and/or store) sensitive user information. These providers employ strict encryption practices to ensure to the public, as well as government regulators, that their web-based platforms are secure. Such practices may include, for example, symmetric key encryption, asymmetric key encryption, public key certificates (also known as a digital certificate or identity certificate), and physical measures such as use of a hardware security module (HSM). A certificate may include information about a public and/or private key, information about the identity of its owner (called the subject), and the digital signature of an entity that has verified the certificate's contents (called the issuer). A standard in the U.S. is Advanced Encryption Standard (AES) (also known by its original name Rijndael), which is a specification for a symmetric-key algorithm established by the U.S. National Institute of Standards and Technology (NIST) and published in 2001.

AES is based on a number of transformation rounds that convert the input, called "plaintext," into the final output, called "ciphertext." Each round consists of several processing steps that depend on an initial cypher key. A set of reverse rounds are applied to transform ciphertext back into the original plaintext using the same initial key. At each round, different subkeys or "round keys" are derived from the initial key using an AES "key expansion schedule." There may also be an initial preprocessing round that does not count toward the total number of rounds. Thus, the key expansion schedule is implemented to produce the needed round keys from the initial key.

The inventor(s) of the present disclosure have identified that, despite being an adopted standard practice in the U.S., AES may still pose a security risk due to the vulnerability of using only a single initial key. If the initial key is obtained by a bad actor, then the security of the cyphertext is at risk. To address these and/or other problems, the present disclosure proposes a new encryption process that is based on AES but uses a modified key expansion schedule which requires multiple different cypher keys as opposed to only a single initial cypher key. A set of multiple keys may be generated pre customer. For a given customer, a key may be stored by a service provider within an HSM, while another key may be stored at a client device of the customer. The key stored by the service provider may include the traditional initial cypher key generated to perform traditional AES, while the key stored at the client device may include a private key used in relation to a digital certificate practice. By virtue of having multiple keys stored in different locations, security is enhanced dramatically. Further, since at least one key would not be accessible to the service provider unless or until the customer logs in, the service provider itself cannot decrypt any encrypted information which they store and/or manage.

One aspect of the present disclosure relates to a system configured to encrypt centralized information associated with users of a customer due diligence platform based on a modified key expansion schedule. One or more implementations of a system may address one or more of the problems described herein, and/or may include the benefits and advantages described and/or that will become apparent to a person of ordinary skill in the art. It is noted that while one or more implementations of the systems and methods presented herein may be related to encrypting a particular type of information (e.g., user profile information) within the context of a customer due diligence platform, this is for illustrative purposes only and not to be considered limiting. Instead, those skilled in the art may recognize that the encryption process(es) described herein may be implemented in other industries employing encryption practices.

With that being said, a system described herein may form a web-based platform (e.g., a customer due diligence platform) through which users are verified/screened and assessed for risk by organizations that abide by, or otherwise must comply with, jurisdictional regulations and/or organizational standards ("compliance organizations"). Users (e.g., individual persons and business entities) may create profiles within the platform by supplying personal information and/or documentation which may be verified for authenticity through one or more automated procedures. Organizations may submit requests for documentation and/or other information about users as part of performing risk assessments.

The system may be configured to provide the organizations with requested authenticated documentation by accessing a database and securely passing that information/documentation to client devices associated with the organizations for display and review. The system may maintain a highly encrypted database(s) of user profiles including the underly data and documentation. Any updates to user data may be stored and made current in the database(s). If user identification and/or other documents expire (and/or are deemed unacceptable), the system may be configured to automatically submit requests for updated documents from the users. Once uploaded, organizations who have been provided access to user data (information/documentation) as part of previous and/or ongoing requests may automatically receive access to the updated information/documentation for further display, review, and/or evaluation/reevaluation of risk.

One or more implementations of a system to encrypt centralized information associated with users of a customer due diligence platform based on a modified key expansion schedule may include one or more of non-transitory electronic storage, one or more hardware processors configured by machine-readable instructions, and/or other components.

The non-transitory electronic storage may be configured to store one or more profiles, and/or other information utilized by the system. The non-transitory electronic storage may form a central source of information storage in which information associated with users is encrypted and stored. The profiles may include one or more of user profiles, organization profiles, and/or other profiles. User profiles may be associated with users of the system who are being assessed for risk. Organization profiles may be associated with compliance organizations who are assessing users for risk because the compliance organizations abide by, or otherwise must comply with, jurisdictional regulations and/or organizational standards. In some implementations, a compliance organization may be a financial institution, such as a bank, while a user may be an individual or business entity who wishes to do business with the financial institution.

The processor(s) may be configured to obtain user profile information making up the user profiles of the users of the customer due diligence platform. The user profile information may include one or more of user information describing the users, documentation information defining one or more authenticated content items associated with the users, and/or other information.

The processor(s) may be configured to encrypt the user profile information to generate encrypted user profile information for storage within non-transitory electronic storage. The encryption of the user profile information may be based on a modified key expansion schedule. The modified key expansion schedule may represent a key expansion scheduled which is modified to require multiple different keys, in particular multiple different private keys, to carry out encryption of the user profile information. In some implementations, the modified key expansion schedule may require a pair of different keys (e.g., two private keys). Individual user profiles may be associated with individual sets of different keys that are specific and/or unique to the individual user profiles. By way of non-limiting illustration, first user profile information of a first user profile may be encrypted based on the modified key expansion schedule to generate first encrypted user profile information. The encryption of the first user profile information may be performed using a first pair of different keys associated with the first user profile. By way of non-limiting illustration, second user profile information of a second user profile may be encrypted based on the modified key expansion schedule to generate second encrypted user profile information. The encryption of the second user profile information may be performed using a second pair of different keys associated with the second user profile.

The processor(s) may be configured to effectuate storage of the encrypted user profile information in association with the user profiles in the non-transitory electronic storage. By way of non-limiting illustration, the first encrypted user profile information may be stored in association with the first user profile; and the second encrypted user profile information may be stored in association with the second user profile.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates a user interface comprising a request status page through which a user views status of request(s), in accordance with one or more implementations.

FIG. 6 illustrates a user interface comprising a request profile page through which a compliance organization specifies request criteria of a request, in accordance with one or more implementations.

FIG. 7 illustrates a user interface comprising a request status page through which a compliance organization views status of request(s), in accordance with one or more implementations.

FIG. 8 illustrates a user interface comprising a risk assessment page showing results of automated risk assessment of a user and providing access to content of a user profile of the user that satisfies a request, in accordance with one or more implementations.

DETAILED DESCRIPTION

Figure 1:
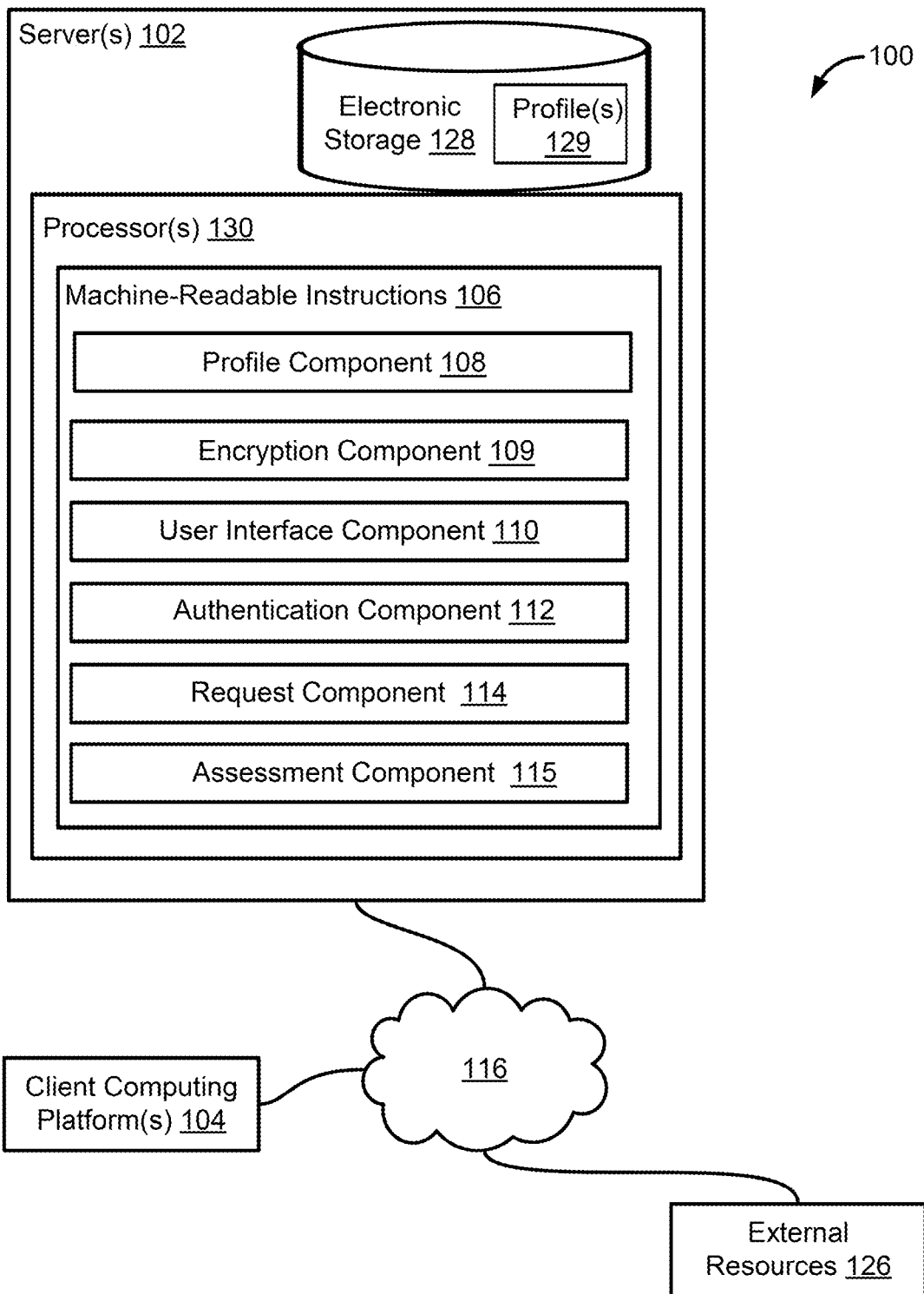
FIG. 1 illustrates a system configured to encrypt centralized information associated with users of a customer due diligence platform based on a modified key expansion schedule, in accordance with one or more implementations.

FIG. 1 illustrates a system 100 configured to encrypt centralized information associated with users of a customer due diligence platform based on a modified key expansion schedule, in accordance with one or more implementations. Users of the system 100 who are compliance organizations may submit requests for documentation and/or other information about other users of the system that are the subject of identity verification and/or risk assessment. The system 100 may be configured to provide the organizations with requested authenticated documentation by accessing a database and securely passing that information/documentation to the organizations for display and review at client devices. The system 100 may be configured to maintain a highly encrypted database of information making up the user profiles, including underly user-supplied information and/or authenticated documentation.

In some implementations, system 100 may include one or more of server(s) 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. It is noted that while both compliance organizations and entities subject to identity verification and/or risk assessment are both "users" of the system 100 (e.g., both may interact with the system 100 and/or each other, and/or impact aspects of the system 100), in some implementations the term "users" may be used refer to the entities subject to identity verification and/or risk assessment, while the compliance organizations may be referred to as "compliance organizations" or "organizations."

Server(s) 102 may include one or more of non-transitory electronic storage 128, one or more processors 130 configured by machine-readable instructions 106, and/or other components. Although non-transitory electronic storage 128 is shown in FIG. 1 as a single entity, this is for illustrative purposes only. In some implementations, non-transitory electronic storage 128 may include a plurality of storage units.

The non-transitory electronic storage 128 may be configured to store one or more profiles 129. The profile(s) 129 may store information associated with users and/or compliance organizations. The profile(s) 129 may include one or more of user profiles, organization profiles, and/or other information. User profiles may be associated with users of the system who are being assessed for risk. Organization profiles may be associated with compliance organizations who are assessing users for risk because the compliance organizations abide by, or otherwise must comply with, jurisdictional regulations and/or organizational rules standards.

In some implementations, a compliance organization may be a financial institution and/or other institution or organization subject to jurisdictional regulation and/or organizational rules and standards (self-imposed or otherwise). By way of non-limiting illustration, a compliance organization may comprise a bank. A user may be an individual or business entity who wishes to do business with a compliance organization (e.g., employ the services of the compliance organization) and will thereafter be the subject of the compliance organization's compliance procedure. By way of non-limiting illustration, a user may be a potential customer. The user may comprise an individual person or a business entity. A business entity may comprise an organization formed to conduct business (e.g., sole proprietorships, partnerships, corporations, limited liability companies (LLCs), etc.). A business entity may itself be made up of individuals including, but not limited to, members, partners, shareholders, and/or other individuals. A business entity may create a user profile representing the business entity as a whole, while individuals making up a business entity may individually create user profiles.

Individual user profiles may include user profile information. The user profile information may include one or more of user information associated with and/or otherwise describing individual users (sometimes referred to as "user verification information"), documentation information defining one or more authenticated content items associated with individual users, and/or other information.

The user information may define values of user attributes and/or other information. The values of the user attributes may describe characteristics of the users and/or authentication requests associated with the users. The user attributes describing characteristics of the users may include one or more of a name attribute, a demographics attribute, a location attribute, a contact attribute, and/or other attributes. The user attributes describing authentication requests associated with the users may include one or more of a requestor attribute, a document attribute, a status attribute, a timing attribute, and/or other attributes. A value of a name attribute may define a name characteristic of a user. A value of a demographics attribute may define demographic characteristics of a user. A value of a location attribute may define a location characteristic of a user. A location characteristic of an individual may include one or more addresses, legal jurisdictions, and/or other information. A value of a contact attribute may define a contact information for a user. Contact information may include one or more of a name of a business agent (for business entities), a telephone number, an email, a social media handle, and/or other information.

The user attributes describing authentication requests associated with the users may include one or more of a requestor attribute, a document attribute, a status attribute, a timing attribute, and/or other attributes.

A value of a requestor attribute may include information identifying individual compliance organizations who have submitted request(s) associated with individual users. Compliance organizations may be identified by name, username, and/or other identifying information. A value of a document attribute may include information identifying and/or describing content items provided by a user, content items that have been authenticated, and/or other content. Individual content items may be identified by one or more document names, content item type, unique IDs, and/or other information. Authenticated content items associated with individual users may refer to documents and/or other content that a user has provided in order to verify their identify and/or otherwise comply with one or more requirements of a risk assessment by a compliance organization. Users may supply (e.g., upload, scan, etc.) content items for encryption and storage. The content items may thereafter be authenticated for accuracy and completeness so that they may become classified as authenticated content items. Authentication may be performed by the system 100 and/or sent to a third-party authentication system (see, e.g., authentication component 112).

A value of a status attribute may describe status of individual requests and/or status of individual authenticated content items. Status of individual requests may characterize current state of the individual requests. State of individual requests may be characterized by one or more of timing information (e.g., when request was received, when information from a user profile was accessed, when a requested ends, and/or other information), completion information (e.g., is the request pending, canceled, expired, incomplete, partially complete, or complete), and/or other information. Status of individual authenticated content items may characterize current state of the individual authenticated content items. State of individual authenticated content items may be characterized by one or more of timing information (e.g., when a content item was uploaded, when a content item was accessed by a user or compliance organization, when a content item was updated or changed, when a content item will expire, when a content item was removed, and/or other information), review status (e.g., was the content item reviewed, is the content item under review, is the content item slated to be removed, was a request to update or change the content item made, and/or other information), and/or other information.

By way of non-limiting illustration, the user profiles may include one or more of a first user profile for a first user, a second user profile for a second user, and/or other user profiles. The first user profile may include first user profile information. The second user profile may include second user profile information. The first user profile may be associated with a first pair of different keys. The second user profile may be associated with a second pair of different keys.

The individual compliance organization profiles may include one or more of organization information describing individual compliance organizations, request information, request profiles, risk profiles and/or other information.

The organization information describing individual compliance organizations may define values of organization attributes and/or other information. The organization attributes describing characteristics of the compliance organizations may include one or more of a name attribute, a location attribute, a contact attribute, and/or other attributes. The one or more of the name attribute, location attribute, contact attribute, and/or other attributes making up the organization attributes may characterize the same or similar information as they do for users who are business entities.

The request information may include values of the request attributes describing characteristics of requests submitted by the compliance organizations. The request attributes describing characteristics requests may include one or more of a subject attribute, a status attribute, a timing attribute, and/or other attributes. A value of a subject attribute may include information identifying users who are subjects of requests submitted by compliance organizations. A value of a status attribute associated with compliance organizations may describe status of individual requests submitted by the compliance organizations and/or status of individual authenticated content items associated with the individual requests.

An individual request profile may include an individual set of request criteria. Individual compliance organizations may be associated with multiple request profiles that each include a customized set of request criteria. Compliance organizations may associate a given request profile with a given type of potential customer, such that they may select and deploy a given request profile on an as-needed basis without having to redefine the request criteria for subsequent requests. The request criteria may indicate a set of criteria that specify content item types and/or other information that may be required as part of assessment by compliance organizations. Content item types may be characterized by document type, document name, and/or other information. Document types may include address verification type, employment verification type, asset ownership type, entity verification type, and/or other types. In some implementations, content item types may be characterized by specific document names (e.g., a specific deed, IRS form, and/or other specified document).

An individual risk profile may include an individual set of risk assessment criteria. Individual compliance organizations may be associated with multiple risk profiles that each include a customized set of risk assessment criteria. Compliance organizations may select and deploy a given risk profile on an as-needed basis without having to redefine the risk assessment criteria for subsequent risk assessments. Risk assessment criteria may include one or more of the risk values that are assigned to particular information and/or weighting information describing weights that are applied to each risk value. In performing risk assessment (see, e.g., assessment component 115), information collected from user profiles may be assigned values, weighted, and aggregated to produce aggregate risk values.

It noted that the above descriptions of user profiles and compliance organization profiles are for illustrative purposes only and are not to be considered limiting. Instead, it is to be understood that the profiles may include other information and/or may define users and compliance organizations in other ways. For example, a compliance organization has the ability to custom-define risk assessment criteria, and compile sets of criteria into risk profiles through the system 100, which may allow the compliance organization to assess risk in any way they deem fit as needed to comply with the particular regulations they may be subject to. Thus, while one or more descriptions herein may provide discrete examples of risk assessment criteria and the content item types that may fit into this criteria, this is for illustrative purposes only and not to be considered limiting. Instead, those skilled in the art may appreciate that this criteria may include other criteria depending on the particular needs of a compliance organization, their industry, and the ever changing landscape of government regulations.

In FIG. 1, machine-readable instructions 106 of one or more processors 130 of server(s) 102 may include one or more instruction components. The instruction components may include computer program components. Executing the machine-readable instructions 106 may cause server(s) 102 to encrypt centralized information associated with users of a customer due diligence platform based on a modified key expansion schedule. The instruction components may include one or more of a profile component 108, an encryption component 109, a user interface component 110, an authentication component 112, a request component 114, an assessment component 115, and/or other instruction components.

The profile component 108 may be configured to obtain, manage, and/or access user profiles and/or compliance organization profiles stored by electronic storage 128. Managing profiles may include one or more of generating profiles, changing profiles, updating existing information within profiles, and/or other features and/or functionality.

The electronic storage 128 may include a secure database that stores encrypted content making up profiles. As information is provided to system 100, it may be encrypted (by encryption component 109) and stored in association with the profiles. In some implementations, electronic storage 128 may comprise and/or include a hardware security module (HSM) that stores and/or manages keys, performs and/or facilitates performance of encryption and decryption functions for digital signatures, and/or performs and/or facilitates performance of other authentication and/or cryptographic functions.

The encryption component 109 may be configured to encrypt the user profile information to generate encrypted user profile information for storage within non-transitory electronic storage 128. The encryption of the user profile information may be based on a modified key expansion schedule and/or other processes and/or information. A modified key expansion schedule may represent a key expansion scheduled which is modified to require multiple different cypher keys.

In some implementations, the modified key expansion schedule may require a pair of different keys (e.g., two different private or cypher keys) and/or one or more other keys. Individual user profiles may be associated with individual sets of different keys that are specific and/or unique to the individual user profiles. By way of non-limiting illustration, first user profile information of the first user profile may be encrypted based on the modified key expansion schedule to generate first encrypted user profile information. The encryption of the first user profile information may be performed using the first pair of different keys associated with the first user profile. By way of non-limiting illustration, the second user profile information of the second user profile may be encrypted based on the modified key expansion schedule to generate second encrypted user profile information. The encryption of the second user profile information may be performed using the second pair of different keys associated with the second user profile.

The encryption component 109 may be configured to generate, for individual user profiles, individual sets of different keys. The individual sets of different keys may include individual pairs of different keys. The individual pairs of different keys may include individual primary keys and individual secondary keys.

The individual primary keys may be generated in relation to encrypting connections between one or more servers 102 and client computing platform(s) 104 associated with the users. The individual primary keys may comprise individual private keys generated in associated with digital certificates issued by the system 100.

The individual secondary keys may be generated in relation to encrypting information for storage. The individual secondary keys may comprise individual private keys of a symmetric-key algorithm. By way of non-limiting illustration, individual secondary keys may comprise individual private keys generated in accordance with traditional AES.

In some implementations, the modified key expansion schedule may comprise a set of rounds (sometimes referred to as "iterations"). The completion of the set of rounds may convert the user profile information of the individual user profiles to the encrypted user profile information. The modified key expansion schedule may generate individual sets of subkeys (sometimes referred to as "round keys"). An individual subkey may be generated for an individual round using individual sets of different keys associated with the individual user profiles. An individual round may comprise a set of processing steps. One or more processing steps in the set of processing steps may comprise an interleaving of the multiple different keys, however, other key combination techniques may be utilized. A person having ordinary skill in the art may appreciate that the use of multiple different keys represents a divergence from a traditional key expansion schedule of Advanced Encryption Standard (AES), and leads to security advantages and/or other advantages over a traditional approach.

Figure 9:
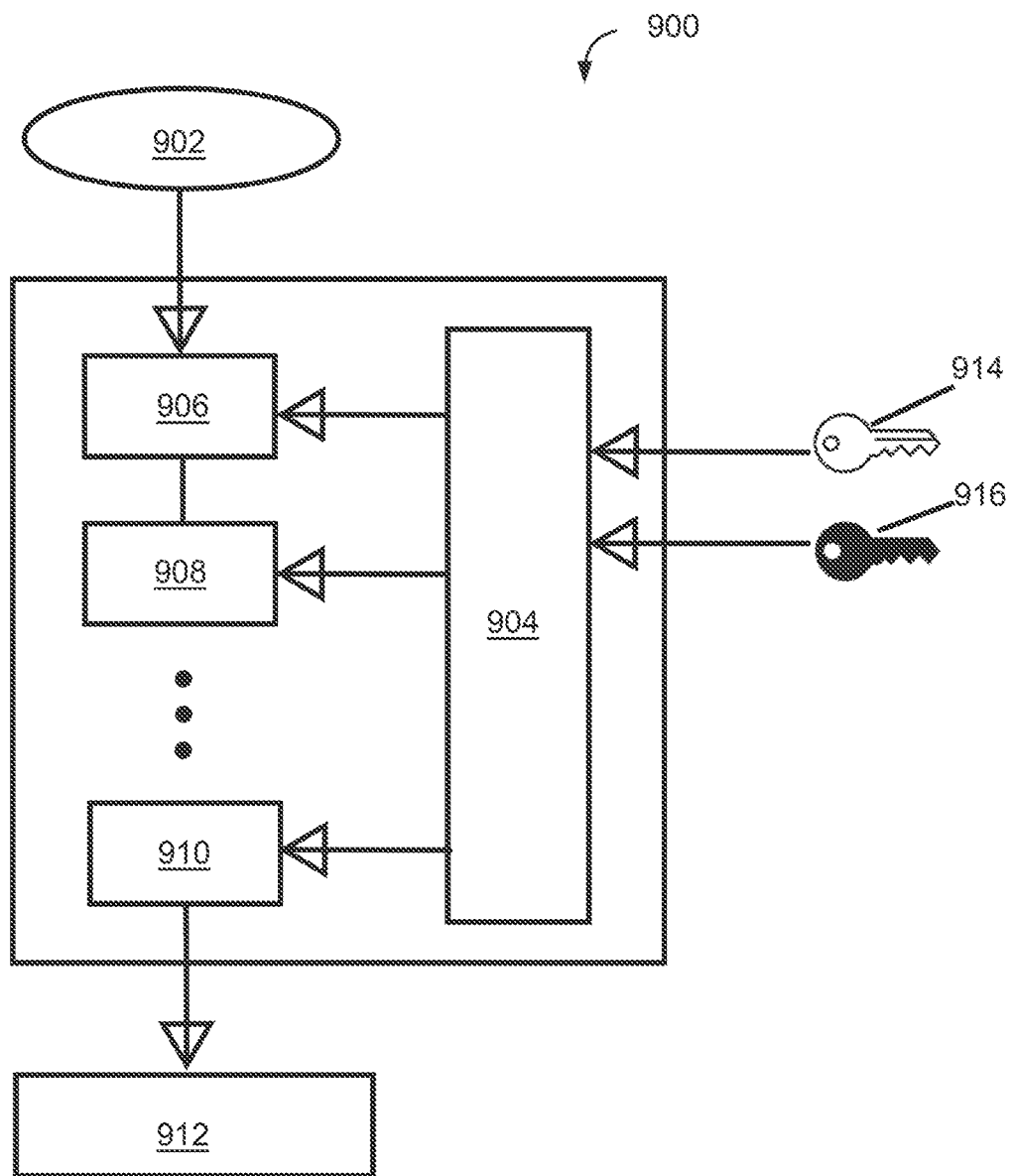
FIG. 9 illustrates a schematic of an encryption process based on a modified key expansion schedule, in accordance with one or more implementations.

FIG. 9 illustrates a schematic 900 of an AES encryption process based on a modified key expansion schedule, in accordance with one or more implementations. The input may comprise plaintext 910; the output may comprise cyphertext 912. In the context of systems and methods presented herein, the input plaintext 902 may include user profile information (and/or portions thereof); the cyphertext 912 may represent encrypted user profile information. The modified key expansion schedule may be represented by a set of processing steps 904 that are performed in association with a set of rounds 906-910. Round 906 may represent a first round (Round 1) and/or a pre-round transformation; round 908 may represent a subsequent round (or first round if 906 is a pre-round transformation); and round 910 may represent the Nth round (Round N), where N is the total number of rounds being performed. Traditionally, a single cypher key is used to derive round keys of the various rounds. However, the modified key expansion schedule of the present disclosure instead requires multiple different keys at the onset. By way of non-limiting illustration, a primary cypher key 914 and a secondary cypher key 916 may be used together to derive the round keys of the various rounds. The use of the multiple different keys may be referred to as an "interleaving" of the keys, described in more detail herein. However, other techniques that combine multiple cypher keys for the purpose of performing key expansion may be used.

Returning to FIG. 1, in some implementations, an interleaving of multiple different keys to generate an individual subkey in an individual round may comprise operations that depend accessing content from each of the different keys, and then forming combinations from the outcome of the operations to form one or more parts of an individual subkey. Individual parts or segments of an individual subkey may be generated and then combined to form a whole, through different sets of operations that depend on content of the multiple different keys. The security of the cyphertext is greatly enhanced through these processes since not one, but multiple keys, are required to successfully carry out the modified key expansion schedule (and/or to perform reverse rounds).

By way of non-limiting illustration, an interleaving of multiple different keys may comprising one or more of operating on an individual primary key to determine an individual portion of an individual subkey, operating on an individual second key to determine an other individual portion of the individual subkey, and/or other processing steps. In some implementations, operating on the individual primary key and/or the individual secondary key may comprise creating temporary vectors from sets of bytes of the individual primary key and/or the individual secondary key. In some implementations, other processing steps in the set of processing steps carried out in an individual round may include one or more of a transposition operation, a Rijndael S-box substitution, an XOR operation, an Rcon operation, and/or other operations. The following description is a more detailed description of the processes performed at an individual round to generate an individual round key.

In some implementations, a pre-round transformation may comprise generating an initial expanded key where the first bytes are all of the bytes of a primary or secondary key. To create succeeding bytes of the expanded key, the following steps may be performed, with iterations (e.g., rounds) numbered from 1. The steps described herein may be repeated until receiving a desirable number of bytes. The steps described herein may include multiple sets of steps. In particular, an implementation may include four different sets of steps that may be repeated until receiving a desirable number of bytes. However, in some implementations, more or fewer sets of steps may be implemented. To simplify the notation, the length (in bytes) of the original primary or secondary key (before expansion) will be denoted as n. Further, some detailed discussion may be provided below based on assumption that we are performing "AES-256." Traditionally, AES-256 requires a 32 bytes key that will be expanded to 240 bytes. Here, however, we may assume the primary and secondary keys are 32 bytes each, with a total 64 bytes that will be expanded to 240 bytes. Those skilled in the art would appreciate the changes that may be required, mutatis mutandis, to implement other block cyphers for AES.

A first set of steps may be related to creating groups of bytes, for example, groups of four bytes. The first set of steps may include one or more of operating on an individual primary key and individual secondary key to creating temporary vectors from sets of bytes of the individual primary key and the individual secondary; a transposition step applied to individual temporary vectors; a logical operation applied to the temporary vectors; implementing a substitution box (e.g., lookup table); an exponentiation; vector addition; and/or other operations. The logical operation may include XOR and/or other operations. The substitution box may include Rijndael S-boxes and/or other substitution methods. The exponentiation may include an Rcon operation and/or other operations. An Rcon operation may add XOR to the leftmost byte in a vector to a number 2 raised to the power number equal to [number of current iteration−1].

By way of non-limiting illustration, with respect to the first set of steps, the last four byes of the individual primary key may be copied to a temporary four-byte vector, Vector A, and those four bytes may be shifted to the left by one position such that the leftmost byte moves to the rightmost position (e.g., a transposition step). Further, the last four byes of the individual secondary key may be copied to a temporary four-byte vector, Vector B, and those four bytes may be shifted to the left by one position such that the leftmost byte moves to the rightmost position. XOR of Vector A and Vector B may create a temporary 4-byte vector, Vector C, presenting an interleaving of the individual primary and secondary keys. Each byte in the Vector C may be replaced by another one, based on Rijndael's S-Boxes, generating a replacement vector. An Rcon operation may include adding XOR the leftmost byte in the replacement vector to a number 2 raised to the power of [number of current iteration−1]. Then XOR the received 4-byte vector to a 4-byte block starting n bytes before the current end of the expanded key, and append the result to the end of the expanded key. At this point, four new key bytes have been created.

A second set of steps may be related to creating a next set of bytes of an expanded key. The second set of steps may be performed multiple times, e.g., three times. The second set of steps may include one or more of a) generating a pointer to the expanded key from the last bit of the expanded key that will be used next: 0 for primary key, and 1 for secondary key; b) copying a set of bytes determined in step a) to a temporary vector; c) a logical operation; d) appending the results to the end of the expanded key; and/or other steps. By way of non-limiting illustration, step b) may include copying the 4 last bytes of the expanded key decided in step a) to a temporary 4-byte vector. Steps c) and d) may include adding XOR the 4-byte vector to a 4-byte block starting n bytes before the current end of the expanded key, and appending the result to the end of the expanded key.

A third set of steps may be performed once in order to create a new set of bytes. The third set of steps may include one or more of a) generating a pointer to the expanded key from the last bit of the expanded key that will be used next: 0 for primary key, and 1 for secondary key; b) copying a set of bytes determined in step a) to a temporary vector; c) replacing each byte using a substitution; d) a logical operation; e) appending the results to the end of the expanded key; and/or other steps. By way of non-limiting illustration, step b) may include copying the 4 last bytes of the expanded key decided in step a) to a temporary 4-byte vector. Step c) may include replacing each byte in the temporary vector by another one based on, for example, Rijndael's S-Boxes. Steps d) and e) may include adding XOR the 4-byte vector to a 4-byte block starting n bytes before the current end of the expanded key, and appending the result to the end of the expanded key.

A fourth set of steps may be related to creating a new set of bytes of an expanded key. The fourth set of steps may be performed one or more times. In some implementations, the fourth set of steps may be performed once. The fourth set of steps may include one or more of a) generating a pointer to the expanded key from the last bit of the expanded key that will be used next: 0 for primary key, and 1 for secondary key; b) copying a set of bytes determined in step a) to a temporary vector; c) a logical operation; d) appending the results to the end of the expanded key; and/or other steps. By way of non-limiting illustration, step b) may include copying the 4 last bytes of the expanded key decided in step a) to a temporary 4-byte vector. Steps c) and d) may include adding XOR the 4-byte vector to a 4-byte block starting n bytes before the current end of the expanded key, and appending the result to the end of the expanded key.

The first-fourth sets of steps may be repeated for additional iterations as needed. For example, after a first iteration, the number of iterations may be increased by 1, and the first-fourth set of steps may be performed again. This may be repeated (e.g., the number of iterations may be again increased by 1) until the desired number of iterations have been achieved.

By way of non-limiting illustration, encryption component 109 may be configured to generate, for the first user profile, a first primary key and a first secondary key as the first pair of different keys. By way of non-limiting illustration, encryption component 109 may be configured to generate, for the second user profile, a second primary key and a second secondary key as the second pair of different keys.

The first encrypted user profile information may be generated based on the modified key expansion schedule using the first pair of different keys by generating a first set of subkeys using the first pair of different keys. By way of non-limiting illustration, generating a first subkey in the first set of subkeys in a first round may be based on the interleaving the first primary key and the first secondary key. Interleaving the first primary key and the first secondary key may comprise one or more of operating on the first primary key to determine a first portion of the first subkey, operating on the first secondary key to determine a second portion of the first subkey, and/or other processing steps.

The encryption component 109 may be configured to effectuate storage of the encrypted user profile information in association with the user profiles in the non-transitory electronic storage 128. By way of non-limiting illustration, the first encrypted user profile information may be stored in association with the first user profile; and the second encrypted user profile information may be stored in association with the second user profile.

User interface component 110 may be configured to effectuate presentation of individual user interfaces on individual client computing platforms of one or more client computing platforms 104. User interface component 110 may be configured to establish one or more network connections between the server(s) 102 and individual client computing platforms. User interface component 110 may be configured to effectuate communication of user interface information to the individual client computing platforms over the one or more network connections to cause the individual client computing platforms to present one or more user interfaces.

User interface component 110 may be configured to generate user interface information defining one or more user interfaces through which users and/or compliance organizations interact with the system 100 and/or each other. A given user interface may be configured to facilitate one or more of defining and/or updating profiles, submitting and/or displaying requests, and/or other features and/or functionality described herein. An instance of a user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input fields, drop down menus, check boxes, display windows, virtual buttons, file drag-and-drop elements, file upload buttons, and/or other elements configured to facilitate user interaction.

An input portion of a user interface may be configured to obtain user input. User input may include one or more of input to generate a profile, input to modify a profile, input to update a profile, input to navigate between pages, and/or other input. The user input may include one or more of entering text, selecting user interface elements, uploading digital content items (e.g., electronic files), and/or other user input. A display portion may be configured to display information.

In some implementations, users may be provided a user interface through which the users manage the user profiles. Managing may include one or more of creating, editing (e.g., adding information and/or documents, modifying information and/or documents), and/or other actions that may impact the content of user profiles. By way of non-limiting illustration, the user interface may be configured to receive user entry and/or selection of user information, uploads of instances of content items to be authenticated, uploads of authenticated content items, and/or other user input. By way of non-limiting illustration, user interface component 110 may be configured to generate user interface information that defines a user interface through which the first user manages content of the first user profile.

User interface component 110 may be configured to effectuate communication of user interface information to computing platforms associated with the users to cause the computing platforms associated with the users to present the user interface through which the users manage the user profiles. By way of non-limiting illustration, user interface component 110 may be configured to effectuate communication of user interface information to the computing platform associated with the first user to cause the computing platform to present the user interface so that the user may manage the first user profile.

In some implementations, a user interface through which users manage the user profiles may include one or more user interface pages (sometimes referred to simply as "pages"). Pages may be expressed as individual portions of a user interface, windows of a user interface, and/or other user interfaces altogether. Users may navigate between pages through one or more of a navigation button, selection of tabs, and/or other user input. The user interface information may further define individual pages of the user interface. An individual page may be dedicated to, and/or otherwise associated with, presenting particular sets of information. By way of non-limiting illustration, pages may include one or more of profile pages through which the users access the user profiles, request status pages displaying status of the requests, document status pages displaying status of individual authenticated content items, and/or other pages.

Figures 3, 4:
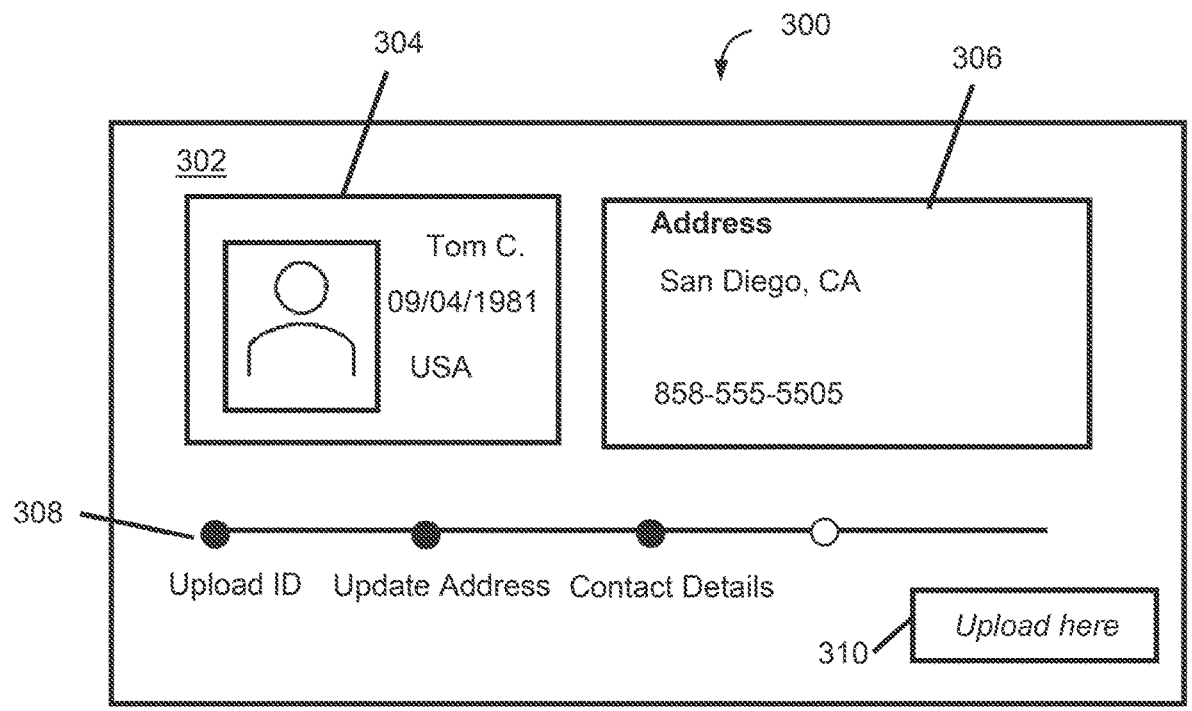
FIG. 3 illustrates a user interface comprising a profile page through which a user manages a user profile, in accordance with one or more implementations.
FIG. 4 illustrates a user interface comprising a document status page through which a user views status of content item(s) shared as part of request(s), in accordance with one or more implementations.

Profile pages may provide users with access to view, edit, update, and/or otherwise interact with content of their user profiles (see, e.g., FIG. 3).

Request status pages may display status of one or more requests from the perspective of users (see, e.g., FIG. 5).

The document status pages may display status of one or more content items and/or authenticated content items (see, e.g., FIG. 4).

In some implementations, an individual page may include grid, and/or other display arrangements. A grid may include one or more of a set of attribute-named columns, a set of rows, individual cells at intersections of individual attribute-named columns and individual rows, and/or other content. An individual attribute-named column may represent an individual attribute. An individual row may represent an individual content item or request. The individual cells may include individual values of the individual attributes represented in the attribute-named columns.

In some implementations, compliance organizations may be provided a user interface may be configured to obtain user entry and/or selection of requests by compliance organizations to verify and assess risk of one or more users. The entry and/or selection of a request may include one or more of entry and/or selection of a user or user profile, request criteria, and/or other information. Individual ones of the requests may identify individual ones of the user profiles and may include request criteria and/or other information.

In some implementations, a user interface provided to compliance organizations may be configured to receive entry and/or selection of request criteria through a set of user interface elements of the user interface. In some implementations, upon entry and/or selection of request criteria, the compliance organizations may be provided an option to save the request criteria into a request profile. In some implementations, entry and/or selection of request criteria may be accomplished through selection of a previously defined request profile.

In some implementations, a user interface provided to compliance organizations may be configured to receive entry and/or selection to submit a request. By way of non-limiting illustration, the user interface may include a virtual button labeled "submit" that causes a request to be executed.

It is noted that while submission of requests is described with respect to entry and/or selection within a user interface of the system 100, this is for illustrative purposes only and not to be considered limiting. Instead, in some implementations, requests may be generated and/or submitted through input into an external resource 126. Compliance organizations and/or users may link external accounts, such as email, social media, message applications, and/or other external accounts. External accounts may be part of external resource (s) 126 in FIG. 1. One or more external accounts may communicate with the server(s) 102. User input into an external account may cause a request to be generated and/or submitted by the system 100. By way of non-limiting illustration, a compliance organization may link an externa email account where sending emails to certain recipients and/or including certain key words may provide the basis for submitting requests.

In some implementations, compliance organizations may be provided a user interface may be configured to obtain user entry and/or selection of risk assessment criteria of risk profiles. A user interface provided to compliance organizations may be configured to receive entry and/or selection of risk assessment criteria through a set of user interface elements of the user interface. The set of user interface element may be configured to receive user input to perform one or more of identify user information and/or content item types, assign risk values the user information and/or content item types, assign weights to the risk values, and/or specify other information making up risk profiles.

The user interface component 110 may be configured to generate user interface information defining a user interface through which content of user profiles are provided to compliance organizations in response to submission of request.

The user interface component 110 may be configured to provide functionality of automated translation of documents to a specified language. By way of non-limiting illustration, the system 100 may include and/or may have access to machine translation functionality that may be performed on user-provided information and/or characters that are recognized from uploaded documents (e.g., performing OCR and machine translation). In some implementations, a machine translation service may be provided through an external resource.

In some implementations, a user interface through which content of the user profiles are accessed by compliance organizations may include one or more pages. By way of non-limiting illustration, pages may include one or more of a request profile page, a request status page, a risk assessment page, and/or other pages.

Request profile pages may provide compliance organizations with access to view, edit, create, update, and/or otherwise interact with request profiles (see, e.g., FIG. 6).

Request status pages of a user interface provided to compliance organizations may display status of one or more requests from the perspective of the compliance organizations (see, e.g., FIG. 7).

Risk assessment pages may comprise pages where compliance organizations define risk assessment criteria (and/or define risk profiles) and/or view the results of automated risk assessments of users based on the risk assessment criteria and content of the user profiles that satisfy the requests (see, e.g., FIG. 8). By way of non-limiting illustration, a risk assessment page may include a risk indicator which displays an aggregated risk value (see, e.g., assessment component 115).

The authentication component 112 may be configured to authenticate content items provided by users. Authentication by authentication component 112 may include processing of content items such as one or more of Optical Character Recognition (OCR), comparing content items against reference content items (e.g., comparing a driver's license photo to an image of a user uploaded by the user, comparing address listed on driver's license to address listed on utility bill, etc.), digital data forensics (e.g., document tamper detection, falsification detection, identifying official insignia or indicia, identifying signatures, etc.), and/or other processors. Those skilled in the art may recognize that document authentication is a technology in and of itself that may be included as part of the system 100 and/or provided through one or more external resources 126. Thus, while not described at length herein, those skilled in the art may appreciate the technical steps and/or procedures that may be required to authenticate user-provided documentation in accordance with one or more features and/or functionality presented herein.

The request component 114 may be configured to obtain and/or generate individual requests based on user input by the compliance organizations into one or more user interfaces. The request component 114 may be configured to obtain and/or generate individual requests based on user input by the compliance organizations into one or more external resources 126.

The request component 114 may be configured to, in response to obtaining individual requests, identify the user profiles associated with the requests, and/or perform other operations. The request component 114 may be configured to, in response to identifying the user profiles, identify content within the user profiles that satisfies the request criteria of the individual ones of the requests, and/or perform other operations. The request component 114 may be configured to, in response to obtaining individual requests, identify the user profiles associated with the requests and identify content within the user profiles that satisfies the request criteria of the individual ones of the requests. In some implementations, satisfaction of requests may be determined based on content of the user profiles being of the content item type(s) specified in the request criteria. In some implementations, request component 114 may be configured to generate and deliver onboarding invites to computing platforms of consumers who have yet to create user profiles within system. The invites may be sent via external messaging, such as email, which may include instructions on creating a user profile within the system 100.

In some implementations, request component 114 may be configured to generate and deliver user requests to computing platforms associated with the users in response to the request criteria of the individual ones of the requests not being satisfied by the content within the user profiles. The user requests may comprise notifications or alerts communicated to computing platforms of the users for presentation within a user interface of the system and/or an external resource (e.g., email). The user requests may notify the users of the content item types that are missing from the user profiles but are required as part of the requests and/or may include other information.

The profile component 108 may be configured to obtain updates to the user profiles. Updates may be provided and/or generated through user input by the users through a user interface used to manage the user profiles.

The user interface component 110 may be configured to automatically update the user interface information defining one or more user interfaces based on updates to the user profiles and/or other information. The updated user interface information may cause the instances of the content displayed in, and/or otherwise accessed through, a user interface provided to compliance organizations to reflect the updates to the user profiles associated with their requests. Such updates may be carried out synchronously so that all requesting compliance organizations are automatically kept up to date without having to manually request and/or retrieve this information.

The request component 114 may be configured to manage requests by monitoring and/or determining status and/or status changes of the requests and/or authenticated content items. The status of the requests may be made current in user and compliance organization profiles. The request component 114 may be configured to determine expired status by querying dates, e.g., stated expiration dates, determining amount of time that has surpasses since an initial date (e.g., date of request, date of upload, and/or other dates).

The user interface component 108 may be configured to generate and/or deliver user requests to computing platforms associated with the users. The user interface component 108 may be configured to generate and/or deliver user requests responsive to the status of the requests being an expired status. The user requests may indicate that additional and/or updated content is required to be uploaded to their user profiles in order to satisfy pending request(s) and/or requests that are resubmitted after expiration.

The assessment component 115 may be configured to perform automated risk assessments. In some implementations, the automated risk assessments may be based on risk assessment criteria defined by compliance organizations, such as risk assessment criteria making up one or more risk profiles created by the compliance organizations. The risk assessment criteria may be compared against the content of the user profiles that satisfy the request criteria. Risk values may be assigned to certain user information and/or content item types, applied to the content of the user profiles that satisfy requests, weighted based on custom-defined weights, and aggregated to provide aggregate risk values. The aggregate risk values may convey overall risk of doing business with a given user. Aggregating may include one or more of summing the weighted risk values, averaging the weighted risk values, and/or other operations. The risk values may include numerical values that make up a sliding scale of risk (e.g., a value being an integer between zero and five, with zero being very low risk of criminal activity and five being very high risk). Weights may be defined by decimal values between zero and one, with zero being no weight is given and one being full weight is given. The outcome of aggregating a set of risk values may be the aggregate risk value which itself may include a numerical value within a range of values making up sliding scale of overall risk. With this final value, a risk indicator may be generated as a visual display of the aggregated risk value shown in relation to the sliding scale.

It is noted that the description of a sliding scale as a visual representation of a risk indicator is for illustrative purposes only and not to be considered limiting. Instead, those skilled in the art may appreciate other ways to visually represent the outcome of a risk assessment. By way of non-limiting illustration, a visual representation may include qualitative description of risk, e.g., a display of the words "high risk," "low risk," "moderate risk," "acceptable risk," and/or other descriptions may be provided.

FIG. 3 illustrates a user interface 300 comprising a profile page 302 through which a user manages a user profile, in accordance with one or more implementations. The user interface 300 may be configured to obtain user entry and/or selection of user information and/or content items. The user interface 300 may include a set of user interface elements. Individual user interface elements may correspond to individual user information and/or content items. Individual user interface elements may include, for example, display and/or text-entry fields. By way of non-limiting illustration, a first element 304 may display identifying information input by a user and/or content of an identification document (e.g., driver's license). A second element 306 may display identifying information input by a user and/or content of an identification document (e.g., driver's license). A third element 310 may be configured to receive user input to provide (e.g., upload) one or more content items (e.g., via drag-and-drop input of electronic files). In some implementations, the profile page 302 may include a status bar 308 displaying status of user input to generate their user profile.

FIG. 4 illustrates a user interface 400 comprising a document status page 402 through which a user views status of content item(s) shared as part of request(s), in accordance with one or more implementations. The user interface 400 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a document name or type attribute 404, a status attribute 406, a date attribute 408 (e.g., timing information), and/or other attributes. An individual row may represent an individual content item or request. The individual cells may include individual values of the individual attributes represented in the attribute-named columns.

FIG. 5 illustrates a user interface 500 comprising a request status page 502 through which a user views status of request(s), in accordance with one or more implementations. The user interface 500 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a requestor attribute 505, a status attribute 506, a date attribute 508 (e.g., timing information), and/or other attributes. An individual row may represent an individual content item or request. The individual cells may include individual values of the individual attributes represented in the attribute-named columns.

FIG. 6 illustrates a user interface 600 comprising a request profile page 602 through which a compliance organization specifies request criteria of a request, in accordance with one or more implementations. The user interface 600 may include a grid comprising a set of attribute-named columns, a set of rows, individual cells at intersections of individual attribute-named columns and individual rows, and/or other content. An individual attribute-named column may represent an individual attribute. An individual row may represent an individual content item or request. By way of non-limiting illustration, the attributes may include a document name or type attribute 604, a demographics attribute 606 (e.g., entity type), a column to specify whether the document type is to be included as part of request criteria of a request (e.g., check boxes), and/or other attributes. The individual cells may include individual values of the individual attributes represented in the attribute-named columns.

FIG. 7 illustrates a user interface 700 comprising a request status page 702 through which a compliance organization views status of request(s), in accordance one or more implementations. The user interface 700 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a subject attribute 704, a status attribute 706, a date attribute 708 (e.g., timing information), and/or other attributes. An individual row may represent an individual content item or request. The individual cells may include individual values of the individual attributes represented in the attribute-named columns.

FIG. 8 illustrates a user interface 800 comprising a risk assessment page 802 showing results of automated risk assessment of a user and providing access to content of a user profile of the user that satisfies a request, in accordance with one or more implementations. By way of non-limiting illustration, a first element 804 may display identifying information input by a user and/or content of an identification document (e.g., driver's license) that is part of the user profile. A second element 806 may display authenticated content items that satisfy criteria of a request and/or document status of the authenticated content items. Compliance organizations may access the authenticated content items by, for example, clicking on a document name which may cause a corresponding authenticated content item to be presented in a window and/or downloaded. The risk assessment page 802 may include a risk indicator which displays an aggregated risk value. By way of non-limiting illustration, the risk indicator may comprise a visual display of a sliding scale 814 with one end being very low risk and the other end being very high risk, and a slider 812 positioned in the scale 814 to represent a determined aggregate risk value.

Returning to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform 104 to interface with system 100 and/or external resources 126, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100. By way of non-limiting illustration, an external entity may include a document authenticator, and/or other entities.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor (s) 130 may be configured to execute components 108, 109, 110, 112, 114, 115, and/or other components. Processor(s) 130 may be configured to execute components 108, 109, 110, 112, 114, 115, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 109, 110, 112, 114, and/or 115 are illustrated in FIG. 1 as being implemented within a single processing unit, in implementations in which processor(s) 130 includes multiple processing units, one or more of components 108, 109, 110, 112, 114, and/or 115 may be implemented remotely from the other components. The description of the functionality provided by the different components 108, 109, 110, 112, 114, and/or 115 described below is for illustrative purposes, and is not intended to be limiting, as any of components 108,

109, 110, 112, 114, and/or 115 may provide more or less functionality than is described. For example, one or more of components 108, 109, 110, 112, 114, and/or 115 may be eliminated, and some or all of its functionality may be provided by other ones of components 108, 109, 110, 112, 114, and/or 115. As another example, processor(s) 130 may be configured to execute one or more additional components that may perform some or all of the functionality attributed below to one of components 108, 109, 110, 112, 114, and/or 115.

Figure 2:
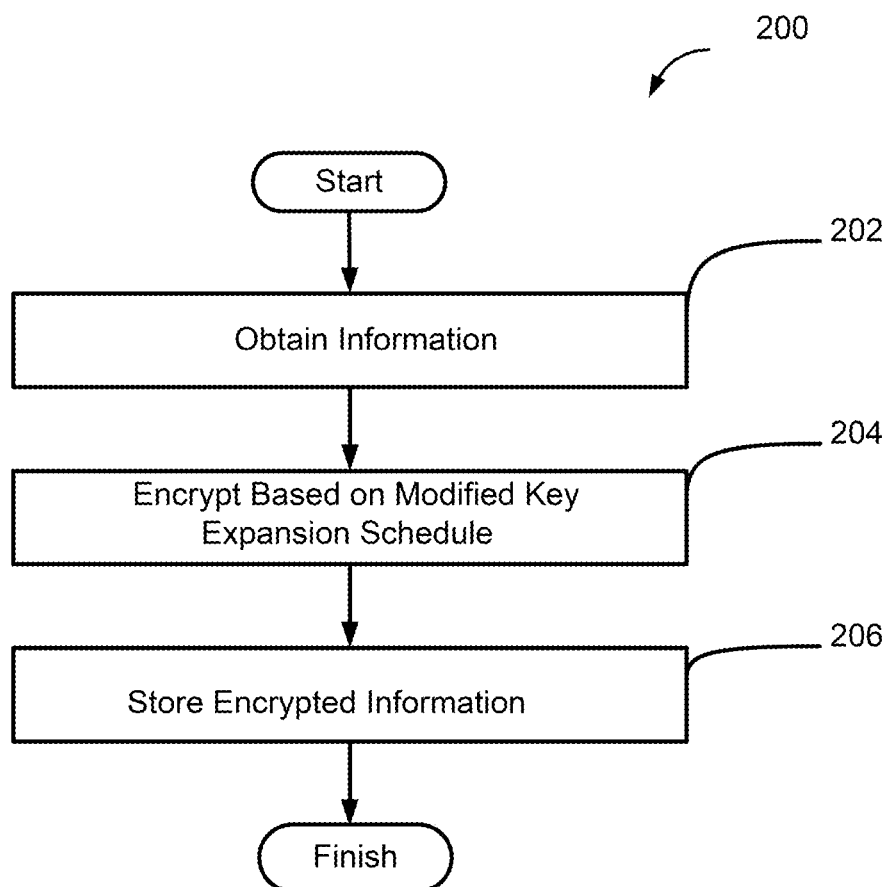
FIG. 2 illustrates a method to encrypt centralized information associated with users of a customer due diligence platform based on a modified key expansion schedule, in accordance with one or more implementations.

FIG. 2 illustrates a method 200 to encrypt centralized information associated with users of a customer due diligence platform based on a modified key expansion schedule, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtain user profile information making up user profiles of users of a customer due diligence platform. The user profile information may include one or more of user information describing the users, documentation information defining one or more authenticated content items associated with the users, and/or other information. Operation 202 may be performed by one or more hardware processors configured by machine-readable instructions including a component that is the same as or similar to profile component 108, in accordance with one or more implementations.

An operation 204 may encrypt the user profile information to generate encrypted user profile information for storage within non-transitory electronic storage. The encryption of the user profile information may be based on a modified key expansion schedule requiring multiple different keys. By way of non-limiting illustration, first user profile information of a first user profile may be encrypted based on the modified key expansion schedule to generate first encrypted user profile information using a first pair of different keys associated with the first user profile. By way of non-limiting illustration, second user profile information of a second user profile may be encrypted based on the modified key expansion schedule to generate second encrypted user profile information using a second pair of different keys associated with the second user profile. Operation 204 may be performed by one or more hardware processors configured by machine-readable instructions including a component that is the same as or similar to encryption component 109, in accordance with one or more implementations.

An operation 206 may effectuate storage of the encrypted user profile information in association with the user profiles in the non-transitory electronic storage. By way of non-limiting illustration, the first encrypted user profile information may be stored in association with the first user profile; and the second encrypted user profile information may be stored in association with the second user profile. Operation 206 may be performed by one or more hardware processors configured by machine-readable instructions including a component that is the same as or similar to encryption component 109, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to encrypt centralized information associated with users of a customer due diligence platform based on a modified key expansion schedule, the system comprising:
   one or more physical processors configured by machine-readable instructions to:
      obtain user profile information making up user profiles of users of a customer due diligence platform, the user profile information including user information describing the users and documentation information defining one or more authenticated content items associated with the users;
      generate, for individual user profiles, individual pairs of different keys, the individual pairs of different keys including individual primary keys and individual secondary keys, such that:
         for a first user profile, a first primary key and a first secondary key are generated as a first pair of different keys; and
         for a second user profile, a second primary key and a second secondary key are generated as a second pair of different keys;
      encrypt the user profile information to generate encrypted user profile information for storage within non-transitory electronic storage, wherein encryption of the user profile information is based on a modified key expansion schedule requiring multiple different keys, such that:
         first user profile information of the first user profile is encrypted based on the modified key expansion schedule to generate first encrypted user profile information using the first pair of different keys associated with the first user profile; and
         second user profile information of the second user profile is encrypted based on the modified key expansion schedule to generate second encrypted user profile information using the second pair of different keys associated with the second user profile;
      effectuate storage of the encrypted user profile information in association with the user profiles in the non-transitory electronic storage, such that the first encrypted user profile information is stored in association with the first user profile and the second encrypted user profile information is stored in association with the second user profile; and wherein the modified key expansion schedule comprises a set of rounds that convert the user profile information of the individual user profiles to the encrypted user profile information by generating individual sets of subkeys, wherein an individual subkey is generated for an individual round of the modified key expansion schedule using the individual pairs of different keys associated with the individual user profiles, such that:

the first encrypted user profile information is generated based on the modified key expansion schedule using the first pair of different keys by generating a first set of subkeys using the first pair of different keys.

2. The system of claim 1, wherein the individual primary keys are generated in relation to encrypting connections between one or more servers and individual client computing platforms associated with individual users; and the individual secondary keys are generated in relation to encrypting stored information.

3. The system of claim 2, wherein the individual primary keys are private keys associated with digital certificates used to authenticate the users; and the individual secondary keys are individual private keys of a Rijndael block cypher.

4. The system of claim 1, wherein the individual round comprises a set of processing steps, wherein a processing step in the set of processing steps comprises an interleaving of the multiple different keys, such that generating a first subkey in the first set of subkeys in a first round is based on the interleaving of the first primary key and the first secondary key.

5. The system of claim 4, wherein the interleaving of the multiple different keys comprises:

operating on an individual primary key to determine an individual portion of an individual subkey, including operating on the first primary key to determine a first portion of the first subkey; and operating on an individual secondary key to determine an other individual portion of the individual subkey, including operating on the first secondary key to determine a second portion of the first subkey.

6. The system of claim 5, wherein the operating on the individual primary key and the individual secondary key comprises creating temporary vectors from sets of bytes of the individual primary key and the individual secondary key.

7. The system of claim 5, wherein other processing steps in the set of processing steps include a transposition operation, a Rijndael S-box substitution, an XOR operation, and an Rcon operation.

8. The system of claim 1, wherein the modified key expansion schedule is a modification of Advanced Encryption Standard (AES) key expansion schedule.

9. A method to encrypt centralized information associated with users of a customer due diligence platform based on a modified key expansion schedule, the method comprising:

obtaining user profile information making up user profiles of users of a customer due diligence platform, the user profile information including user information describing the users and documentation information defining one or more authenticated content items associated with the users;

generating, for individual user profiles, individual pairs of different keys, the individual pairs of different keys including individual primary keys and individual secondary keys, including:

for a first user profile, generating a first primary key and a first secondary key as a first pair of different keys; and for a second user profile, generating a second primary key and a second secondary key as a second pair of different keys;

encrypting the user profile information to generate encrypted user profile information for storage within non-transitory electronic storage, wherein encryption of the user profile information is based on a modified key expansion schedule requiring multiple different keys, including:

encrypting first user profile information of the first user profile based on the modified key expansion schedule to generate first encrypted user profile information using the first pair of different keys associated with the first user profile; and encrypting second user profile information of the second user profile based on the modified key expansion schedule to generate second encrypted user profile information using the second pair of different keys associated with the second user profile;

effectuating storage of the encrypted user profile information in association with the user profiles in the non-transitory electronic storage, including effectuating storage of the first encrypted user profile information in association with the first user profile and the second encrypted user profile information in association with the second user profile; and wherein the modified key expansion schedule comprises a set of rounds that convert the user profile information of the individual user profiles to the encrypted user profile information by generating individual sets of subkeys, wherein an individual subkey is generated for an individual round of the modified key expansion schedule using the individual pairs of different keys associated with the individual user profiles, such that:

generating the first encrypted user profile information is based on the modified key expansion schedule using the first pair of different keys by generating a first set of subkeys using the first pair of different keys.

10. The method of claim 9, wherein the individual primary keys are generated in relation to encrypting connections between one or more servers and individual client computing platforms associated with individual users; and the individual secondary keys are generated in relation to encrypting stored information.

11. The method of claim 10, wherein the individual primary keys are private keys associated with digital certificates used to authenticate the users; and the individual secondary keys are individual private keys of a Rijndael block cypher.

12. The method of claim 9, wherein the individual round comprises a set of processing steps, wherein a processing step in the set of processing steps comprises an interleaving of the multiple different keys, such that generating a first subkey in the first set of subkeys in a first round is based on the interleaving of the first primary key and the first secondary key.

13. The method of claim 12, wherein the interleaving of the multiple different keys comprises:

operating on an individual primary key to determine an individual portion of an individual subkey, including operating on the first primary key to determine a first portion of the first subkey; and operating on an individual secondary key to determine an other individual portion of the individual subkey, including operating on the first secondary key to determine a second portion of the first subkey.

14. The method of claim 13, wherein the operating on the individual primary key and the individual secondary key comprises creating temporary vectors from sets of bytes of the individual primary key and the individual secondary key.

15. The method of claim 13, wherein other processing steps in the set of processing steps include a transposition operation, a Rijndael S-box substitution, an XOR operation, and an Rcon operation.

16. The method of claim 9, wherein the modified key expansion schedule is a modification of Advanced Encryption Standard (AES) key expansion schedule.

* * * * *